United States Patent
Lopez

(10) Patent No.: US 8,867,644 B2
(45) Date of Patent: Oct. 21, 2014

(54) RECEIVER FOR VOICE SERVICES OVER ADAPTIVE MULTI-USER CHANNELS ON ONE SLOT

(75) Inventor: Miguel Lopez, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 454 days.

(21) Appl. No.: 13/141,252

(22) PCT Filed: Jun. 24, 2009

(86) PCT No.: PCT/SE2009/050802
§ 371 (c)(1),
(2), (4) Date: Jun. 21, 2011

(87) PCT Pub. No.: WO2010/074631
PCT Pub. Date: Jul. 1, 2010

(65) Prior Publication Data
US 2011/0255641 A1    Oct. 20, 2011

Related U.S. Application Data

(60) Provisional application No. 61/139,703, filed on Dec. 22, 2008.

(51) Int. Cl.
*H04L 5/12* (2006.01)
*H04L 25/03* (2006.01)

(52) U.S. Cl.
CPC . *H04L 25/03006* (2013.01); *H04L 2025/03426* (2013.01)
USPC ........... 375/261; 375/260; 375/267; 375/298; 375/299; 375/329; 375/346; 375/347

(58) Field of Classification Search
USPC ......... 375/261, 260, 267, 298, 299, 329, 346, 375/347
See application file for complete search history.

(56) References Cited

U.S. PATENT DOCUMENTS

| | | | |
|---|---|---|---|
| 2004/0192215 A1 | 9/2004 | Onggosanusi | |
| 2006/0109938 A1* | 5/2006 | Challa et al. | 375/347 |
| 2010/0067440 A1* | 3/2010 | Dick et al. | 370/328 |

OTHER PUBLICATIONS

3rd Generation Partnership Project. "MUROS Intra-Cell Interference and TSC Design." 3GPP TSG GERAN #38, Tdoc GP-080602, Agenda 7.1.5.6, Malaga, Spain, May 12-16, 2008.
Chen, X. et al. "A Scheme of Multi-User Reusing One Slot on Enhancing Capacity of GSM/EDGE Networks." 11th IEEE Singapore International Conference on Communication Systems, Guangzhou, China, Nov. 19-21, 2008.

* cited by examiner

Primary Examiner — Kabir A Timory
(74) Attorney, Agent, or Firm — Coats & Bennett, PLLC

(57) ABSTRACT

A receiver, in particular a VAMOS receiver, is provided. The receiver is adapted to split the complex-valued baseband signal into its real and imaginary parts. The two branch system thus created is modeled as a real-valued Multiple Input Multiple Output, MIMO, system. The receiver is further adapted to use correlations of the noise, both in time and between branches of a channel to suppress the noise for multi-users in the same channel. In accordance with one embodiment the receiver is adapted to take into account the known symmetries present in a symbol constellation when more than one user exists in the same channel. This is for example the case in adaptive symbol constellation such as an adaptive alpha-QPSK constellation. Using the receiver in accordance with the above can provide the same performance as a joint detection receiver in the presence of Gaussian white noise, while giving better interference suppression than either SAIC or joint detection in the presence of GMSK modulated interference.

14 Claims, 4 Drawing Sheets

RECEIVER FOR VOICE SERVICES OVER ADAPTIVE MULTI-USER CHANNELS ON ONE SLOT

TECHNICAL FIELD

The present invention relates to a method and a receiver for receiving signals in a mobile station. In particular the present invention relates to a method and a receiver for receiving a VAMOS transmitted signal.

BACKGROUND

The rapid growth of the subscriber base in Global System for Mobile communication (GSM) has increased the need for increased voice capacity. Therefore mobile network operators and telecom equipment manufacturers have agreed to open a new Release 9 work item in the Third Generation partnership Project (3GPP) standardization. The work item has been named "Voice services over Adaptive Multi-user channels on One Slot" (VAMOS). It is described in 3GPP TSG GERAN GP-081949 "New WID: Voice services over Adaptive Multi-user Orthogonal Sub channels".

The VAMOS air interface is based upon the concept of Adaptive Symbol Constellation, see 3GPP TSG GERAN GP-081633 Draft TR on Circuit Switched Voice Capacity Evolution for GERAN. Two different mobile station supports are envisaged for VAMOS aware mobile stations:
1. VAMOS aware mobile stations with legacy architecture: These mobile stations are supporting Downlink Advanced Receiver Performance (DARP) phase 1 capability and can operate the new designed training sequences. Radio performance requirements for these mobile stations will be specified with higher priority.
2. VAMOS aware mobiles with advanced receiver architectures.

The new modulation introduced in 3GPP TSG GERAN GP-081949 "New WID: Voice services over Adaptive Multi-user Orthogonal Sub channels" employs a time varying signal constellation called adaptive alpha-QPSK. This quaternary constellation is parameterized by a real-valued parameter. This real-valued parameter defines the shape of the signal constellation, and it can change from burst to burst. The real and imaginary parts of the baseband signal are assigned to two users and constitute two sub-channels.

Mobile station architectures based on the DARP phase 1 capability employ so-called Single Antenna Interference Cancellation (SAIC). SAIC mobile stations were designed to demodulate a Gaussian Minimum Shift Keying (GMSK) carrier and suppress GMSK-modulated interference. These mobile stations are typically designed to suppress one dominant interferer. They can be used to suppress the second sub-channel in an alpha-QPSK modulated signal and therefore can be used as receivers for the VAMOS technique.

However, the SAIC methodology does not exploit the fact that when alpha-QPSK modulation is used, the second sub-channel has a very particular structure for example a constant 90 degree phase shift with respect to the first sub-channel. Moreover, a SAIC receiver will experience the second sub-channel as the dominant interference and it will lose effectiveness suppressing additional external interferers.

VAMOS aware mobile stations that exploit knowledge of the two training sequences for the two users and of the shape signal constellation have been proposed, see the international patent application No. PCT/SE2008/051255. When an ordinary QPSK demodulator or a proper modification of a QPSK modulator to deal with alpha-QPSK is used, then joint detection is performed. This type of receiver offers optimal performance whenever the signal is corrupted by Gaussian white noise only. But such a receiver is unable to effectively suppress any external interference.

Hence, there exists a need for an improved receiver. In particular there is a need for a receiver adapted to receive a VAMOS transmitted signal.

SUMMARY

It is an object of the present invention to overcome or at least reduce some of the problems associated with existing receivers.

It is another object to provide an improved receiver for a VAMOS aware mobile station receiver with one antenna branch. Such receiver falls within the category 2 of VAMOS mobile station with advanced receiver architecture described above.

At least one of the above objects is obtained by the method and the receiver as set out in the appended claims. Thus, in accordance with the present invention a receiver, in particular a VAMOS receiver is provided, which receiver is adapted to split the complex-valued baseband signal into its real and imaginary parts, thus creating a two branch system. The two branch system is modeled as a Multiple Input Multiple Output, MIMO, system with two real-valued inputs and two real-valued outputs. The receiver is further adapted to use correlations of the noise, both in time and between branches of a channel to suppress the interference for multi-users in the same channel.

In accordance with one embodiment the receiver is adapted to take into account the known symmetries present in a symbol constellation when more than one user exist in the same channel. This is for example the case in adaptive symbol constellation such as an adaptive alpha-QPSK constellation. Using the receiver in accordance with the above can provide the same performance as a joint detection receiver in the presence of Gaussian white noise, while giving better interference suppression than either SAIC or joint detection in the presence of GMSK modulated interference.

The invention also extends to a method for receiving a signal in accordance with the above.

BRIEF DESCRIPTION OF THE DRAWINGS

The present invention will now be described in more detail by way of non-limiting examples and with reference to the accompanying drawings, in which.

DETAILED DESCRIPTION

Figure 1:
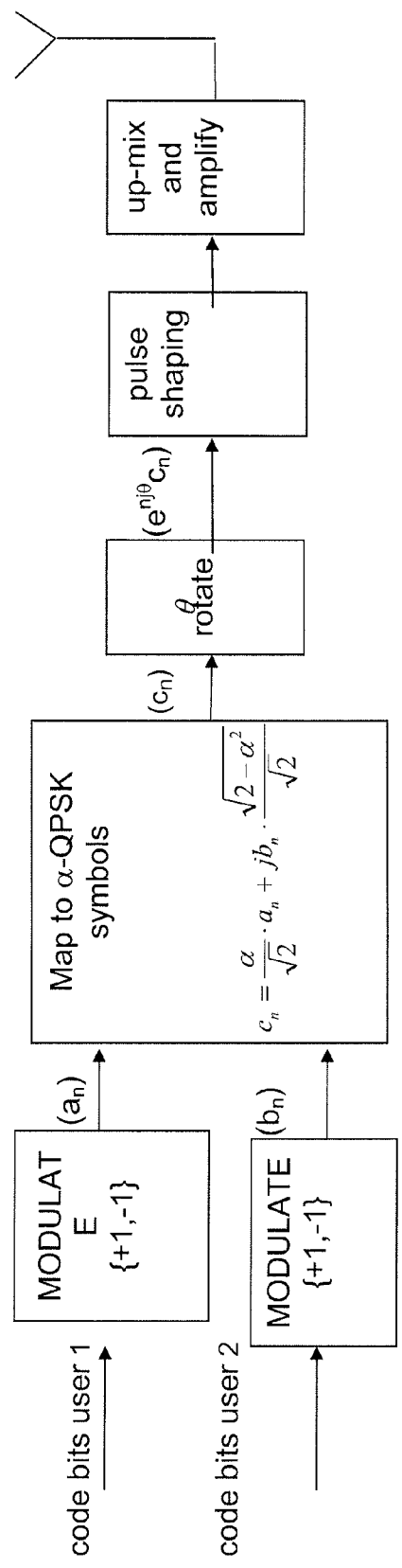
FIG. 1 is a view illustrating an alpha QPSK modulator.
Figure 2:
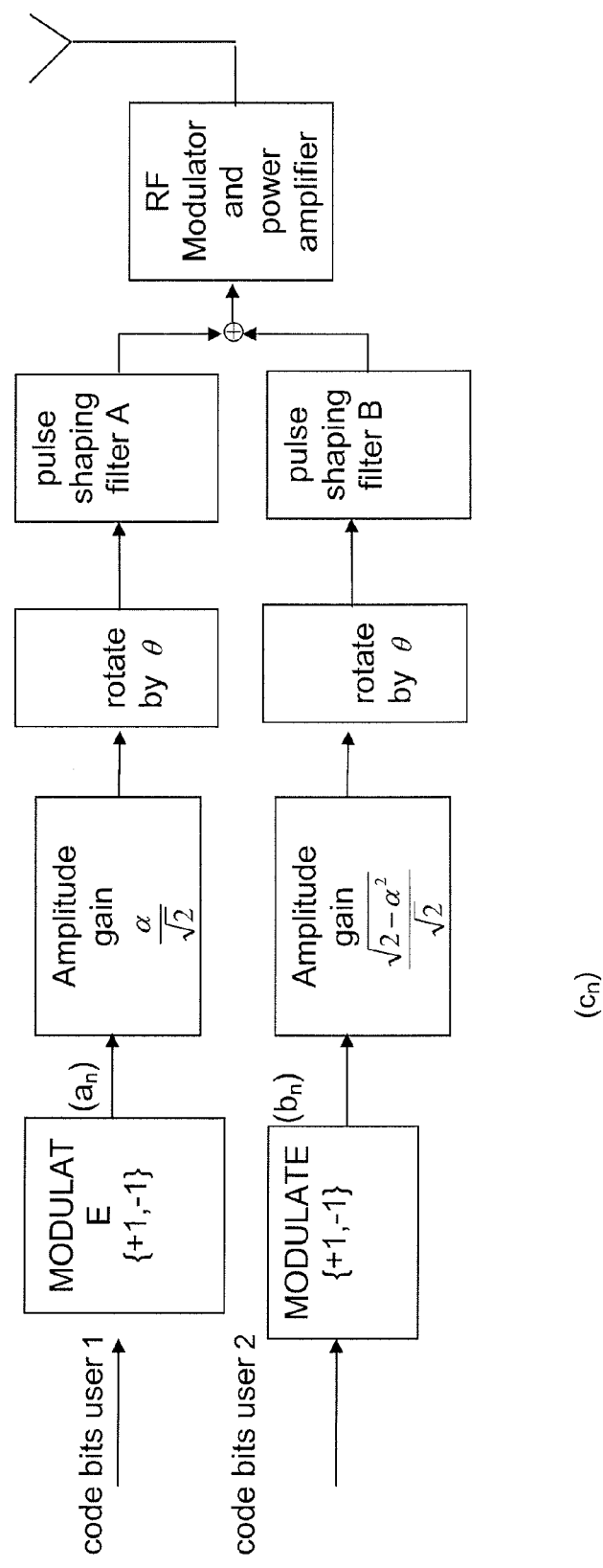
FIG. 2 is a view illustrating a variant of the alpha QPSK modulator.

In FIG. 1 the modulator described in 3GPP TSG GERAN GP-081633 Draft TR on Circuit Switched Voice Capacity Evolution for GERAN is shown. In FIG. 2 the modulator described in 3GPP TSG GERAN GP-090113 VAMOS Physical Layer Adaptation Schemes is shown. It is a slight generalization of the modulator shown in FIG. 1. The difference between the modulators depicted in FIG. 1 and FIG. 2 is that in FIG. 2 two different pulse shaping filters are used.

The parameter α defines the shape of the constellation and the signal is rotated by an angle θ. Without loss of generality, assume that the receiver must decode the signal intended for user 1. The baseband received signal ($r_n$) sampled at the symbol rate can be written in terms of an L-tap complex-valued channel $(h_k)_{k=0}^{L-1}$, the desired user binary symbols $(a_n)_{n=0}^{N}$, the binary symbols for user 2, $(b_n)_{n=0}^{N}$, the synchronization position n0 and noise plus interference ($w_n$):

$$r_{n+n0} = \frac{\alpha}{\sqrt{2}} \sum_{k=0}^{L-1} h_k e^{(n-k)j\theta} a_{n-k} + j\frac{\sqrt{2-\alpha^2}}{\sqrt{2}} \sum_{k=0}^{L-1} h_k e^{(n-k)j\theta} b_{n-k} + w_n \quad (1)$$

The baseband model (1) gives a mathematical representation of a received signal transmitted by the modulator shown in FIG. 1.

Equivalently, after de-rotation by θ, $$r'_{n+n0} = \frac{\alpha}{\sqrt{2}} \sum_{k=0}^{L-1} h'_k a_{n-k} + j\frac{\sqrt{2-\alpha^2}}{\sqrt{2}} \sum_{k=0}^{L-1} h'_k b_{n-k} + w'_n \quad (2)$$

where the prime indicates that the signal and the channel taps have been de-rotated.

Below some known technologies, namely SAIC and joint detection are described. A SAIC receiver uses a signal model of the form $$r'_{n+n0} = \frac{\alpha}{\sqrt{2}} \sum_{k=0}^{L-1} h'_k a_{n-k} + z_n, \quad (3)$$

where ($z_n$) models the noise plus interference. By Comparing equation (2) and equation (3), it can be noted that the knowledge of the structure of the signal intended for user 2 is not used. That is, the explicit form of the second term on the right hand side of (2) is not used by a SAIC receiver.

On the other hand, a joint detection receiver uses the model in accordance with equation (2) but it is unable to exploit any correlations between the real and imaginary parts of ($w_n'$). Thus, such a receiver is optimal only if ($w_n'$) is white, circularly symmetric complex Gaussian noise. It can be noted that GMSK interference is not a circularly symmetric, white Gaussian process.

Taking real and imaginary parts in Equation (2), and using the fact that the symbols $(a_n)_{n=0}^N$ and $(b_n)_{n=0}^N$ are real-valued, the following pair of equations is obtained.

$$\mathcal{R}e(r'_{n+n0}) = \quad (4)$$
$$\frac{\alpha}{\sqrt{2}} \sum_{k=0}^{L-1} \mathcal{R}e(h'_k) a_{n-k} - \frac{\sqrt{2-\alpha^2}}{\sqrt{2}} \sum_{k=0}^{L-1} \mathcal{J}m(h'_k) b_{n-k} + \mathcal{R}e(w'_n)$$

$$\mathcal{J}m(r'_{n+n0}) = \frac{\alpha}{\sqrt{2}} \sum_{k=0}^{L-1} \mathcal{J}m(h'_k) a_{n-k} + \frac{\sqrt{2-\alpha^2}}{\sqrt{2}} \sum_{k=0}^{L-1} \mathcal{R}e(h'_k) b_{n-k} + \mathcal{J}m(w'_n)$$

By defining $$\vec{r}_n = \begin{bmatrix} \mathcal{R}e(r'_{n+n0}) \\ \mathcal{J}m(r'_{n+n0}) \end{bmatrix},$$

$$H_k = \begin{bmatrix} \frac{\alpha}{\sqrt{2}}\mathcal{R}e(h'_k) & -\frac{\sqrt{2-\alpha^2}}{\sqrt{2}}\mathcal{J}m(h'_k) \\ \frac{\alpha}{\sqrt{2}}\mathcal{J}m(h'_k) & \frac{\sqrt{2-\alpha^2}}{\sqrt{2}}\mathcal{R}e(h'_k) \end{bmatrix}, \vec{w}_n = \begin{bmatrix} \mathcal{R}e(w'_n) \\ \mathcal{J}m(w'_n) \end{bmatrix}$$

It is possible to re-write equation (4) into a matrix form:

$$\vec{r}_n = \sum_{k=0}^{L-1} H_k \begin{bmatrix} a_{n-k} \\ b_{n-k} \end{bmatrix} + \vec{w}_n \quad (5)$$

This is a 2×2 Multiple Input Multiple Output (MIMO) real-valued system, with spatially and temporally correlated noise ($\vec{w}_n$). In order to obtain optimum performance both sequences of symbols $(a_n)_{n=0}^N$ and $(b_n)_{n=0}^N$ must be simultaneously demodulated. Known interference suppression and symbol detection algorithms can be applied to equation (5). For example the methodology for synchronization and channel estimation of time dispersive MIMO systems can be applied to the model (5), see e.g. the international patent application No. PCT/IB2005/002149. Another example is the MLSE with spatio-temporal interference cancellation described in: "MLSE and Spatio-Temporal Interference Rejection Combining With Antenna Arrays, D. Asztely and B. Ottersten, Ninth European Signal Processing Conference Eusipco-98", which can also be applied to equation (5). Only one of the two branches in (5) is necessary in order to perform joint demodulation of both sequences of symbols. The other branch provides the diversity necessary for spatial or spatio-temporal interference suppression.

In accordance with one embodiment the following example of interference cancellation based on the model equation (5) is given. In the example given the Interference Rejection Combining methodology described in "Interference cancellation using antenna diversity for EDGE-enhanced data rates in GSM and TDMA/136, Bladsjo, D.; Furuskar, A.; Javerbring, S.; Larsson, E. Vehicular Technology Conference, 1999. VTC 1999—Fall. IEEE VTS 50th Volume 4, Issue, 1999 Page(s):1956-1960 vol. 4" is as follows. Let $Q = E[\vec{w}_n \cdot \vec{w}_n^T]$ be the 2×2 spatial covariance matrix of the noise. First, a Cholesky (in general any square-root) factorization $Q^{-1} = D^T D$ is performed. Decorrelation of the 2 branches in equation (5) is achieved by multiplying both sides of equation (5) by D.

$$D \cdot \vec{r}_n = \sum_{k=0}^{L-1} D \cdot H_k \begin{bmatrix} a_{n-k} \\ b_{n-k} \end{bmatrix} + D \cdot \vec{w}_n. \quad (6)$$

This simple linear transformation performs interference suppression. Writing $\vec{y}_n = D \cdot \vec{r}_n$, $G_k = D \cdot H_k$, $\vec{e} = D \cdot \vec{w}_n$ equation (6) becomes:

$$\vec{y}_n = \sum_{k=0}^{L-1} G_k \begin{bmatrix} a_{n-k} \\ b_{n-k} \end{bmatrix} + \vec{e}_n, \quad (7)$$

where ($\vec{e}_n$) is a two dimensional white noise. The model in accordance with equation (7) can now be considered as a time dispersive 2×2 MIMO system with additive Gaussian white noise. Optimum detectors are known for these signals. Better performance can be obtained if ($\vec{w}_n$) in equation (5) is modeled as a Vector Autoregressive process as in "MLSE and Spatio-Temporal Interference Rejection Combining With Antenna Arrays, D. Asztely and B. Ottersten, Ninth European Signal Processing Conference Eusipco-98, or if the modeling methodology described in PCT/IB2005/002149 is used.

Figure 3:
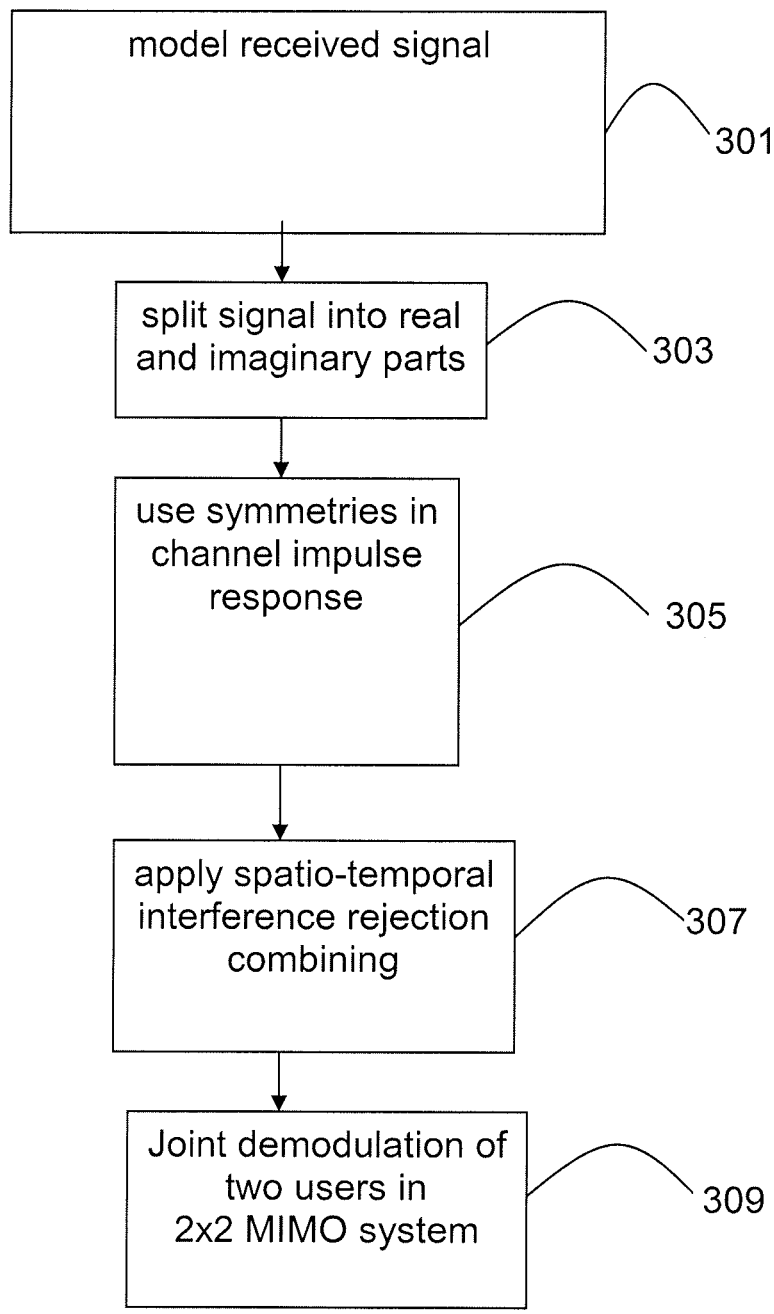
FIG. 3 is a flowchart illustrating procedural steps performed during Multi-user detection with single antenna interference cancellation.

The methodology for multi-user detection and interference suppression with a single antenna is summarized in the flowchart in FIG. 3.

Thus, first in a step 301 the received signal is modeled as a two-user, one dimensional, complex-valued alpha-QPSK modulated signal. Next, in a step 303, the received signal is split into real and imaginary parts. Next, in a step 305 a model using symmetries in channel impulse response to obtain a real-valued 2×2 MIMO system with colored noise is generated. Then, in a step 307 a spatio-temporal interference rejection combining to suppress external interference is applied. Then, in a step 309 joint demodulation of two users in 2×2 MIMO system is performed.

More generally, the methodology described in equations (4)-(7) can be applied to baseband models of the form $$r_{n+n0} = \frac{\alpha}{\sqrt{2}} \sum_{k=0}^{L-1} h_k e^{(n-k)j\theta} a_{n-k} + j\frac{\sqrt{2-\alpha^2}}{\sqrt{2}} \sum_{k=0}^{L-1} g_k e^{(n-k)j\theta} b_{n-k} + w_n, \quad (8)$$

where $(h_k)_{k=0}^L$ and $(g_k)_{k=0}^L$ model the channels for users 1 and 2 respectively, and the symbols $(a_n)_{n=0}^N$ and $(b_n)_{n=0}^N$ are real-valued. No particular relationships between the channels for the two users are assumed and the two user signals are pulse amplitude modulated (PAM).

The baseband model (8) gives a mathematical representation of a received signal transmitted by the modulator shown in FIG. 2.

After de-rotation by θ, (8) becomes $$r'_{n+n0} = \frac{\alpha}{\sqrt{2}} \sum_{k=0}^{L-1} h'_k a_{n-k} + j\frac{\sqrt{2-\alpha^2}}{\sqrt{2}} \sum_{k=0}^{K-1} g'_k b_{n-k} + w'_n, \quad (9)$$

where the prime indicates that the signal and the channel taps have been de-rotated.

Taking real and imaginary parts in equation (9), and using the fact that the symbols $(a_n)_{n=0}^N$ and $(b_n)_{n=0}^N$ are real-valued, the following pair of equations are obtained $$\mathcal{R}e(r'_{n+n0}) = \quad (10)$$

$$\frac{\alpha}{\sqrt{2}} \sum_{k=0}^{L-1} \mathcal{R}e(h'_k) a_{n-k} - \frac{\sqrt{2-\alpha^2}}{\sqrt{2}} \sum_{k=0}^{K-1} \mathcal{J}m(g'_k) b_{n-k} + \mathcal{R}e(w'_n),$$

$$\mathcal{J}m(r'_{n+n0}) = \frac{\alpha}{\sqrt{2}} \sum_{k=0}^{L-1} \mathcal{J}m(h'_k) a_{n-k} +$$

$$\frac{\sqrt{2-\alpha^2}}{\sqrt{2}} \sum_{k=0}^{K-1} \mathcal{R}e(g'_k) b_{n-k} + \mathcal{J}m(w'_n).$$

Define $$\vec{r}_n = \begin{bmatrix} \mathcal{R}e(r'_{n+n0}) \\ \mathcal{J}m(r'_{n+n0}) \end{bmatrix},$$

$$H_k = \begin{bmatrix} \frac{\alpha}{\sqrt{2}} \mathcal{R}e(h'_k) & -\frac{\sqrt{2-\alpha^2}}{\sqrt{2}} \mathcal{J}m(g'_k) \\ \frac{\alpha}{\sqrt{2}} \mathcal{J}m(h'_k) & \frac{\sqrt{2-\alpha^2}}{\sqrt{2}} \mathcal{R}e(g'_k) \end{bmatrix}, \vec{w}_n = \begin{bmatrix} \mathcal{R}e(w'_n) \\ \mathcal{J}m(w'_n) \end{bmatrix}.$$

Then (10) can be recast in matrix form $$\vec{r}_n = \sum_{k=0}^{L} H_k \begin{bmatrix} a_{n-k} \\ b_{n-k} \end{bmatrix} + \vec{w}_n. \quad (11)$$

This is a 2×2 MIMO real-valued system, with spatially and temporally correlated noise ($\vec{w}_n$). The MIMO model has the same functional form as the model described in equation (5). Thus, interference suppression together with joint detection may also be applied to this model in exactly the same way, for example applying spatial decorrelation as in equations (6) and (7), or using more advanced spatio-temporal decorrelation methods.

From equation (5) it is seen that the trellis for the (soft or hard) demodulation of the two streams of binary user symbols $(a_n)_{n=0}^N$ and $(b_n)_{n=0}^N$ has $4^L$ transitions. A typical channel length in GSM is L=5. This yields 1024 transitions. The complexity of the demodulator can be greatly reduced by re-shaping or shortening the channel impulse response. Since equation (5) is a 2×2 MIMO system, this procedure can be quite complex and difficult.

However, the special structure of the channel can be used as follows. A single-input-single-output all-pass filter that transforms the complex channel $(h_k')_{k=0}^{L-1}$ into a minimum phase channel is calculated. Such filters are widely used in GSM/EDGE for the demodulation of 8PSK modulated signals, see "Equalization Concepts for EDGE, W. Gerstacker and R. Schober, IEEE Transactions on Wireless Communications Vol 1 No 1, January 2002. These are scalar filters and there are efficient algorithms to calculate them. Moreover, since the filter is an all-pass filter it does not alter the color of the noise, nor does the all-pass filter enhance or suppress the noise. Applying the all-pass filter to both sides of equation (2) a model of the form:

$$\vec{r}'_{n+n0} = \frac{\alpha}{\sqrt{2}} \sum_{k=0}^{L-1} \tilde{h}'_k a_{n-k} + j \frac{\sqrt{2-\alpha^2}}{\sqrt{2}} \sum_{k=0}^{L-1} \tilde{h}'_k b_{n-k} + \tilde{w}_n. \qquad (11)$$

is obtained.

This model has the same form as equation (2). The carrier to interference plus noise is the same as in equation (2), but the channel $(\tilde{h}_k')_{k=0}^{L-1}$ is minimum phase. This means that for every $$M \geq 0, \sum_{k=0}^{M} |\tilde{h}'_k|^2 \geq \sum_{k=0}^{M} |h'_k|^2.$$

In other words, the energy is concentrated in the first taps. The model of equation (11) can be transformed into a model of the foil of equation (5) by following exactly the same steps leading from equation (2) to equation (5) above. The minimum phase property allows for a reduced state equalization since it is possible to choose M<L and write the model in the form:

$$\vec{r}_n = \sum_{k=0}^{M-1} \tilde{H}_k \begin{bmatrix} a_{n-k} \\ b_{n-k} \end{bmatrix} + \sum_{k=M}^{L-1} \tilde{H}_k \begin{bmatrix} a_{n-k} \\ b_{n-k} \end{bmatrix} + \vec{w}_n, \qquad (12)$$

Where $$\vec{r}_n = \begin{bmatrix} \mathcal{R}e(\vec{r}'_{n+n0}) \\ \mathcal{I}m(\vec{r}'_{n+n0}) \end{bmatrix},$$

$$\tilde{H}_k = \begin{bmatrix} \frac{\alpha}{\sqrt{2}} \mathcal{R}e(\tilde{h}'_k) & -\frac{\sqrt{2-\alpha^2}}{\sqrt{2}} \mathcal{I}m(\tilde{h}'_k) \\ \frac{\alpha}{\sqrt{2}} \mathcal{I}m(\tilde{h}'_k) & \frac{\sqrt{2-\alpha^2}}{\sqrt{2}} \mathcal{R}e(\tilde{h}'_k) \end{bmatrix}, \vec{w}_n = \begin{bmatrix} \mathcal{R}e(\tilde{w}_n) \\ \mathcal{I}m(\tilde{w}_n) \end{bmatrix}.$$

Figure 4:
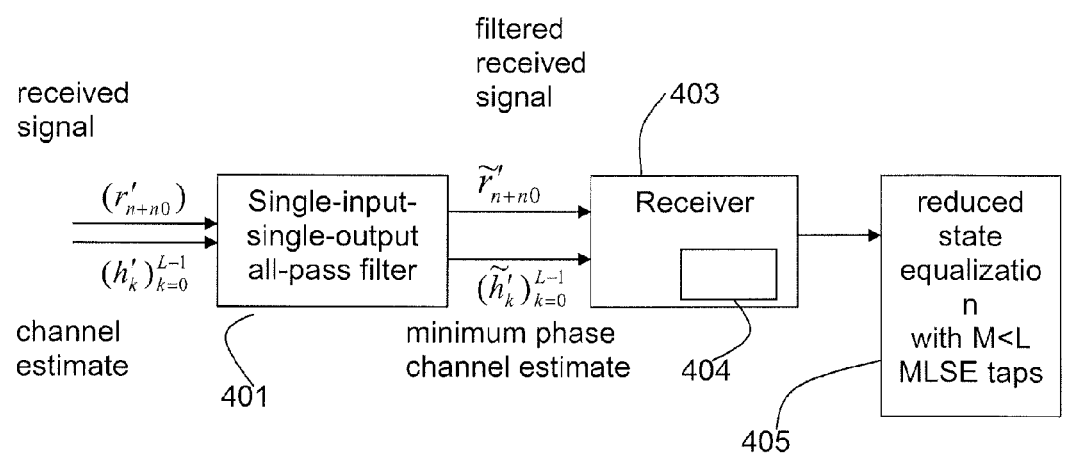
FIG. 4 is a view of a receiver adapted to use reduced state multi-user detection with single antenna interference cancellation.

The Viterbi trellis search is performed on a reduced trellis with $4^M$ transitions, and the remaining L–M taps corresponding to the second sum on the right hand of equation (12) can be fed back as in a decision feedback estimator. In FIG. 4 a view illustrating an exemplary receiver arrangement 400 using reduced state multi-user detection with single antenna interference cancellation is shown.

The receiver of FIG. 4 comprises a single input single output all-pass filter 401. The all-pass filter can be adapted to receive a received input signal and a channel estimate. Using the all-pass filter will reduce the computational load on the receiver. The output from the all-pass filter is fed to a receiver block 403. The receiver 403 can in accordance with one embodiment be adapted to perform the steps described above in conjunction with FIG. 3. The method steps of FIG. 3 can for example be performed using a specially programmed computer 404 or a similar device such as an ASIC. The output from the receiver block is fed to reduced state equalization block 405 with M<L MLSE taps.

The receiving method and receiver as described herein provides improved receiver performance, surpassing the known technologies for interference suppression with only one antenna branch. The receiver achieves excellent performance in both interference and coverage scenarios with low complexity for VAMOS.

The invention claimed is:

1. A receiver for receiving a complex-valued baseband signal that includes noise, the receiver configured to split the complex-valued baseband signal into a real part associated with a real branch and an imaginary part associated with an imaginary branch, the receiver comprising a receiver block configured to:
   model the real and imaginary branches as a Multiple Input Multiple Output system with two real-valued inputs and two real-valued outputs, wherein the real branch corresponds to a first user in an adaptive alpha-QPSK modulated signal and the imaginary branch corresponds to a second user in the adaptive alpha-QPSK modulated signal; and
   suppress interference for multiple users in a first channel using correlations of the noise, both in time and between branches of the first channel, wherein one branch of the first channel is used to detect the symbol sequence and not for spatial temporal interference suppression, and the other branch of the first channel is used for spatial temporal interference suppression and not for symbol sequence detection.

2. The receiver according to claim 1, wherein the receiver block is further configured to simultaneously demodulate symbol sequences of the first and second users.

3. The receiver according to claim 1, wherein the Multiple Input Multiple Output system comprises spatially and temporally correlated noise.

4. The receiver according to claim 1, wherein the receiver block is further configured to apply a spatio-temporal interference rejection combining to suppress external interference.

5. The receiver according to claim 1, wherein the receiver comprises a Voice services over Adaptive Multi-user channels on One Slot receiver.

6. The receiver according to claim 1, wherein the receiver block is further configured to take into account known symmetries present in a symbol constellation when more than one user exists in the first channel.

7. The receiver according to claim 6, wherein the symbol constellation comprises an adaptive alpha-QPSK constellation.

8. A method of receiving a complex-valued baseband signal that includes nose, wherein the received signal is split into a real part associated with a real branch and an imaginary part associated with an imaginary branch, the method comprising:
   modeling the real and imaginary branches as a Multiple Input Multiple Output system with two real-valued inputs and two real-valued outputs, wherein the real branch corresponds to a first user in an adaptive alpha-QPSK modulated signal and the imaginary branch corresponds to a second user in the adaptive alpha-QPSK modulated signal; and
   suppressing interference for multiple users in the a first channel using correlations of the noise, both in time and between branches of the first channel, wherein one branch of the first channel is used to detect the symbol sequence and not for spatial temporal interference suppression, and the other branch of the first channel is used for spatial temporal interference suppression and not for symbol sequence detection.

9. The method according to claim 8, wherein the symbol sequences of the first and second users are simultaneously demodulated.

10. The method according to claim 8, wherein the Multiple Input Multiple Output system comprises spatially and temporally correlated noise.

11. The method according to claim 8 further comprising applying a spatio-temporal interference rejection combining to suppress external interference.

12. The method according to claim 8, wherein the signal is received using a Voice services over Adaptive Multi-user channels on One Slot, VAMOS, receiver.

13. The method according to claim 8, wherein known symmetries present in a symbol constellation when more than one user exists in the first channel are taken into account when receiving the signal.

14. The method according to claim 13, wherein the symbol constellation comprises an adaptive alpha-QPSK constellation.

\* \* \* \* \*

UNITED STATES PATENT AND TRADEMARK OFFICE
CERTIFICATE OF CORRECTION

| | | |
|---|---|---|
| PATENT NO. | : 8,867,644 B2 | Page 1 of 1 |
| APPLICATION NO. | : 13/141252 | |
| DATED | : October 21, 2014 | |
| INVENTOR(S) | : Lopez | |

It is certified that error appears in the above-identified patent and that said Letters Patent is hereby corrected as shown below:

In the specification

In Column 7, Line 20, delete "foil of" and insert -- form of --, therefor.

In the claims

In Column 8, Line 54, in Claim 8, delete "in the a first" and insert -- in a first --, therefor.

Signed and Sealed this
Twentieth Day of October, 2015

Michelle K. Lee
*Director of the United States Patent and Trademark Office*